UNITED STATES PATENT OFFICE.

GRAHAM EDGAR, OF WASHINGTON, DISTRICT OF COLUMBIA, ASSIGNOR TO UNITED STATES OF AMERICA, AS REPRESENTED BY THE SECRETARY OF WAR.

FERTILIZER AND PROCESS OF MAKING SAME.

1,413,013.  Specification of Letters Patent.  Patented Apr. 18, 1922.

No Drawing.  Application filed January 3, 1920. Serial No. 349,353.

*To all whom it may concern:*

Be it known that I, GRAHAM EDGAR, a citizen of the United States, stationed at Washington, District of Columbia, have invented an Improvement in Fertilizer and Process of Making Same, of which the following is a specification.

This invention relates to the manufacture of fertilizers containing both fixed nitrogen and other fertilizing materials in an available form and has for its objects, the production of a fertilizer having a relatively high content of urea and also the utilization in such production of calcium cyanamide together with other fertilizing materials, as, for example, phosphate rock or bone meal, etc.

Heretofore, it has been proposed, as stated in the Patent No. 1,275,276, to mix a phosphate (either tri-calcium, di-calcium or mono-calcium phosphate) containing free acid, with sufficient calcium cyanamide to effect neutralization of the acid, in order to obtain a product containing urea and phosphoric acid in available form. Various procedures are described in said patent, including the mixing of phosphate rock (tri-calcium phosphate), calcium cyanamide, acid and water together to first form acid phosphate, which it is asserted produces urea. It is also stated that calcium phosphate may be mixed with cyanamide and the acid added thereafter.

The principal objections to the various processes heretofore proposed for the utilization of calcium cyanamide and tri-calcium phosphate in the production of fertilizer containing both fixed nitrogen and phosphoric acid in available form, are: first, that calcium cyanamide is not effectively converted into urea when treated with acid in the presence of diluents or neutralizing substances such as tri-calcium phosphate or acid phosphates, except when the ratio of calcium cyanamide to acid phosphate is very small (about 1-10); and, second, that effective conversion of calcium cyanamide into urea in the presence of acid phosphate occurs only at relatively high temperatures, such for example as 70°–80° C., and under these conditions a considerable loss of available phosphoric acid occurs due to transformation into soluble phosphate. These considerations have in general limited the amount of calcium cyanamide used in fertilizer mixtures to a maximum of about 6% of the amount of acid phosphate.

My investigations have shown that in order to effectively convert calcium cyanamide into urea it is essential (1) that the same be treated with a strong mineral acid in an amount substantially in excess of that necessary to neutralize the lime content of the calcium cyanamide (both free and combined); (2) that a substantial excess of strong mineral acid must be maintained throughout substantially the entire course of the reaction, and (3) that the reaction should be allowed to proceed to completion prior to the addition thereto of neutralizing bodies, such as phosphate rock or bone meal, or other neutralizing material possessing fertilizing value, such for example as ammonium or potassium carbonate and especially the carbonates from Nebraska brines.

Furthermore, my investigations have shown that urea is less readily decomposed in the presence of strong mineral acids than in the presence of diluents or weakly acidic substances and therefore higher temperatures may be employed for the reaction than in the case where the formation of urea occurs in the presence of such substances as acid phosphate.

In carrying out my invention, I preferably proceed as follows:—

Calcium cyanamide (20–22% fixed nitrogen) is gradually added to a strong mineral acid, preferably sulphuric acid of 20% to 50% strength, care being taken to prevent the temperature from rising substantially above the point at which urea readily decomposes. The gradual addition of a strong mineral acid to the cyanamide has been found to be unsatisfactory for the reason that there would not be an excess of acid present throughout the initial stage of the process and therefore the urea and other nitrogenous compounds, which are far more stable in the presence of an excess of mineral acid, would be decomposed with the consequent loss of fixed nitrogen compounds. The amount of acid required is substantially in excess of that necessary to neutralize the entire lime content of calcium cyanamide (both free and combined), such amount being determined by the conditions most favorable for the formation of urea and being preferably not less than 20% in excess of the theoretical.

Sufficient neutralizing material containing ingredients of fertilizing value, as for example commercial ground phosphate rock (preferably 100–200 mesh) is then added to neutralize the free mineral acid and, in those cases where phosphate rock is used as the neutralizing agent, to also form available phosphate, the temperature during this stage being also maintained below the point at which urea decomposes.

By following the foregoing procedure it is possible to obtain, (1) a fertilizer product containing considerably more than 50% of the total nitrogen thereof combined in the form of urea; (2), a fertilizer product containing urea together with other ingredients having substantial fertilizing value; (3) a fertilizer product in which if desired the ratio between the urea and the phosphoric acid anhydride will be not less than one part of urea to three parts of phosphoric acid anhydride ($P_2O_5$) and may be so great that the urea content equals or exceeds the content of $P_2O_5$, whereas in products heretofore produced the ratio between the urea and the $P_2O_5$ corresponded to a much smaller fraction than that above named.

Among the various advantages resulting from the employment of the above described invention may be mentioned the fact that the objectionable action of calcium cyanamide upon the skin is believed to be entirely obviated; the objectionable dusting of calcium cyanamide is eliminated; the special toxic effects of calcium cyanamide on growth of plants and germination of seeds are eliminated, and other fertilizing ingredients, such as phosphoric acid, are introduced in any desired proportion into the fixed nitrogen compound in a simple, expeditious and economical manner.

The product resulting from the foregoing procedure may be mixed in any desired proportion with acid phosphate to form standard mixed fertilizer without causing loss of available phosphoric acid, due to the fact that the lime is present in the form of a salt or a mineral acid, and consequently, my material may be mixed with any other fertilizer ingredients without danger of objectionable results.

Furthermore, the urea which is produced is considered to be one of the most, if not the most, desirable forms of fixed nitrogen, since it is easily, but not too readily, decomposed, it is assimilable by many plants without injury, which are in some cases seriously injured by other forms of fixed nitrogen.

While I do not wish to be understood as intending to restrict myself thereto, I have also discovered that the control of the temperature during the reaction of the strong mineral acid upon the calcium cyanamide can be suitably controlled so as to prevent destructive decomposition in the mass, by the employment of pneumatic cooling means, preferably air. For example, 2,952 parts of sulphuric acid (figured 100% acid) in the form of a 15 normal solution, i. e. 734 gr. per liter, are introduced into a vessel provided with a perforated coil, rose spray nozzle or the like for homogenously distributing currents of air throughout the liquid and 2,000 parts of cyanamid are gradually added thereto while blowing sufficient air through the liquid to prevent the temperature rising to the boiling point and preferably so as to maintain the same from 80° to 100° C.

The reaction will proceed uniformly without serious loss of ammonia or other deleterious decomposition.

After the reaction is completed an amount of phosphate rock sufficient to neutralize the excess acid is added and preferably the injection of air into the mass is continued during this neutralization stage of the process. A proportion of about 1200 grs. of 70% phosphate rock for 2,000 grs. of cyanamide treated as above noted is found to be very advantageous.

In addition to controlling the temperature of the mass, the air currents serve as a dehydrating agent since they entrain considerable moisture in their passage through the mass and as a consequence the product will when the reaction is completed be reasonably granular and dry, i. e. non-pasty or not objectionably sticky, and will upon short exposure to the air rapidly dry out sufficiently to be packed for shipment without further treatment.

Having thus described my invention, what I claim is as follows:

1. A process of making a fertilizer which consists in decomposing calcium cyanamide with a strong mineral acid substantially in excess of that necessary to neutralize the lime (both free and combined) contained therein, and then adding a sufficient quantity of a neutralizing substance including a fertilizing ingredient to substantially convert the excess of said mineral acid into a salt.

2. A process of making a fertilizer which consists in decomposing calcium cyanamide with a strong mineral acid substantially in excess of that necessary to neutralize the lime (both free and combined) contained therein, and then adding a calcium compound of phosphoric acid in sufficient amount to substantially convert the excess of said mineral acid used into a calcium salt and to form available phosphate.

3. A process of making a fertilizer which consists in decomposing cyanamide with a strong mineral acid substantially in excess of that necessary to neutralize the lime (both free and combined) contained therein, and then adding a tri-calcium phosphate in sufficient amount to convert the excess of said mineral acid used into a calcium salt and to form available phosphate.

4. A process of making a fertilizer which consists in decomposing cyanamide with a strong mineral acid substantially in excess of that necessary to neutralize the lime (both free and combined) contained therein, and then adding finely comminuted phosphate rock in sufficient amount to convert the excess of said mineral acid used into a calcium salt and to form available phosphate.

5. A fertilizer containing urea and available phosphate in a ratio of not less than one part of urea to three parts of phosphoric acid anhydride.

6. A fertilizer containing urea, calcium sulphate, being substantially free from free acid or free lime and containing a salt of a mineral acid having substantial fertilizing value.

7. A process of making a fertilizer which consists in decomposing calcium cyanamide with a strong mineral acid substantially in excess of that necessary to neutralize the lime, (both free and combined) contained therein, while maintaining the temperature of the mass during such decomposition at a temperature not substantially exceeding 100° C.

8. A process of making a fertilizer which consists in decomposing calcium cyanamide with a strong mineral acid substantially in excess of that necessary to neutralize the lime, (both free and combined) contained therein, the major portion of the cyanamide formed thereby and sufficient to convert urea while pneumatically maintaining the temperature of the mass during such decomposition at a temperature not substantially exceeding 100° C.

9. A process of making a fertilizer which consists in decomposing calcium cyanamide with a strong sulphuric acid substantially in excess of that necessary to neutralize the lime, (both free and combined) contained therein, while maintaining the temperature of the mass during such decomposition at a temperature between about 80° C. to 100° C., and then adding a sufficient quantity of a neutralizing substance including a fertilizing ingredient to substantially convert the excess of said mineral acid into a salt.

Washington, D. C., July 25th, 1919.

GRAHAM EDGAR.